(12) United States Patent
Manevich et al.

(10) Patent No.: US 12,294,469 B2
(45) Date of Patent: May 6, 2025

(54) BOUNDARY CLOCK SYNCHRONIZED LOOP

(71) Applicant: MELLANOX TECHNOLOGIES, LTD., Yokneam (IL)

(72) Inventors: Natan Manevich, Ramat HaSharon (IL); Dotan David Levi, Kiryat Motzkin (IL); Wojciech Wasko, Młynek (PL); Ariel Almog, Kohav Yair (IL); Bar Shapira, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 399 days.

(21) Appl. No.: 17/885,604

(22) Filed: Aug. 11, 2022

(65) Prior Publication Data

US 2023/0370305 A1    Nov. 16, 2023

Related U.S. Application Data (60) Provisional application No. 63/340,955, filed on May 12, 2022.

(51) Int. Cl.
| | | |
|---|---|---|
| H04L 12/42 | (2006.01) | |
| G06F 1/10 | (2006.01) | |
| H04J 3/06 | (2006.01) | |
| H04L 12/43 | (2006.01) | |

(52) U.S. Cl.
CPC .............. *H04L 12/422* (2013.01); *G06F 1/10* (2013.01); *H04J 3/0667* (2013.01); *H04L 12/43* (2013.01)

(58) Field of Classification Search
CPC ......... H04L 12/422; H04L 12/43; G06F 1/10; H04J 3/0667
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |

(Continued)

FOREIGN PATENT DOCUMENTS

| | | |
|---|---|---|
| CN | 106817183 A | 6/2017 |
| CN | 108829493 A | 11/2018 |
| EP | 1215559 B1 | 9/2007 |
| EP | 2770678 A1 | 8/2014 |

(Continued)

OTHER PUBLICATIONS

Levi et al., U.S. Appl. No. 17/246,730, filed May 3, 2021.

(Continued)

*Primary Examiner* — Mohammad S Anwar
(74) *Attorney, Agent, or Firm* — Meitar Patents Ltd.; Daniel Kligler (57) ABSTRACT

In one embodiment, a synchronized communication system includes a plurality of network devices, and clock connections to connect the network devices in a closed loop configuration, wherein the network devices are configured to distribute among the network devices a reference clock time from any selected one of the network devices.

31 Claims, 6 Drawing Sheets

(56) References Cited

U.S. PATENT DOCUMENTS

| | | | |
|---|---|---|---|
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B1 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,623,173 B1 | 4/2020 | Geng et al. |
| 10,637,776 B2 | 4/2020 | Iwasaki |
| 10,727,966 B1 | 7/2020 | Izenberg et al. |
| 10,778,361 B1 | 9/2020 | Almog et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0055676 A1* | 2/2009 | Wiebe .................. G06F 11/1604 |
| | | | 713/501 |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0078901 A1* | 3/2016 | Toma .................. H04N 21/643 |
| | | | 386/355 |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1* | 5/2020 | Gaist .................. H04J 3/0697 |
| 2020/0235905 A1 | 7/2020 | Su et al. |

(56) References Cited

U.S. PATENT DOCUMENTS

| | | |
|---|---|---|
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2020/0403652 A1* | 12/2020 | Goff ............... H04J 3/0617 |
| 2021/0006344 A1 | 1/2021 | Chen et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1* | 12/2021 | Ranganathan ........ H03L 7/1974 |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0191578 A1 | 6/2022 | Ramkumar et al. |
| 2022/0121691 A1 | 7/2022 | Mentovich et al. |
| 2022/0224500 A1 | 7/2022 | Mula et al. |
| 2022/0239549 A1 | 7/2022 | Zhao et al. |
| 2022/0342086 A1 | 10/2022 | Yoshida |
| 2022/0390979 A1 | 12/2022 | Xu |

FOREIGN PATENT DOCUMENTS

| | | | |
|---|---|---|---|
| JP | 2011091676 | A | 5/2011 |
| TW | 498259 | B | 8/2002 |
| WO | 2012007276 | A1 | 1/2012 |
| WO | 2013124782 | A2 | 8/2013 |
| WO | 2013143112 | A1 | 10/2013 |
| WO | 2014029533 | A1 | 2/2014 |
| WO | 2014138936 | A1 | 9/2014 |

OTHER PUBLICATIONS

Levi et al., U.S. Appl. No. 17/315,396, filed May 10, 2021.
Levi et al., U.S. Appl. No. 17/359,667, filed Jun. 28, 2021.
Wasko et al., U.S. Appl. No. 17/520,674, filed Nov. 7, 2021.
Wasko et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 JITTER Requirements", AN562, pp. 1-16, year 2021.
Intel, "Can Altera GX/GT/GZ device high speed transceivers handle Spread Spectrum Clocking (SSC), as required by PCIe or SATA/SAS protocols?", p. 1, Sep. 11, 2012.
Pismenny et al., U.S. Appl. No. 17/824,954, filed May 26, 2022.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/867,779 Office Action dated Mar. 28, 2024.
U.S. Appl. No. 17/549,949 Office Action dated Mar. 30, 2023.
Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3(SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
WIKIPEDIA—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
Ipclock, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
Levy et al., U.S. Appl. No. 17/313,026, filed May 6, 2021.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
Manevich et al., U.S. Appl. No. 17/579,630, filed Jan. 20, 2022.
Levi et al., U.S. Appl. No. 17/871,937, filed Jul. 24, 2022.
Manevich et al., U.S. Appl. No. 17/867,779, filed Jul. 19, 2022.
Levi et al., U.S. Appl. No. 17/868,841, filed Jul. 20, 2022.
U.S. Appl. No. 17/579,630 Office Action dated Oct. 24, 2022.
U.S. Appl. No. 17/579,630 Office Action dated Jan. 12, 2023.
U.S. Appl. No. 17/670,540 Office Action dated Jan. 18, 2023.
U.S. Appl. No. 17/191,736 Office Action dated Nov. 10, 2022.
Levi et al., U.S. Appl. No. 17/582,058, filed Jan. 24, 2022.
U.S. Appl. No. 17/191,736 Advisory Action dated Feb. 16, 2023.
"IEEE Standard for Local and Metropolitan Area Networks—Timing and Synchronization for Time-Sensitive Applications," IEEE Std 802.1AS-2020, IEEE Computer Society, pp. 1-421, year 2020.
U.S. Appl. No. 17/867,779 Office Action dated Jan. 30, 2025.

* cited by examiner

BOUNDARY CLOCK SYNCHRONIZED LOOP

RELATED APPLICATION INFORMATION

The present application claims benefit of US Provisional Patent Application Ser. No. 63/340,955 of Manevich, et al., filed 12 May 2022, the disclosure of which is hereby incorporated herein by reference.

FIELD OF THE INVENTION

The present invention relates to computer systems, and in particular, but not exclusively to, clock synchronization.

BACKGROUND

Clock and frequency synchronization among network devices is used in many network applications. One application of using a synchronized clock value is for measuring latency between two devices. If the clocks are not synchronized the resulting latency measurement will be inaccurate.

Synchronous Ethernet (SyncE) is an International Telecommunication Union Telecommunication (ITU-T) Standardization Sector standard for computer networking that facilitates the transference of clock signals over the Ethernet physical layer. In particular, SyncE enables clock synchronization inside a network with respect to a master clock.

The actual clock value (e.g., in Coordinated Universal Time (UTC) format) is handled by higher layer standards and protocols, such as Precision Time Protocol (PTP).

SUMMARY

There is provided in accordance with an embodiment of the present disclosure, a synchronized communication system, including a plurality of network devices, and clock connections to connect the network devices in a closed loop configuration, wherein the network devices are configured to distribute among the network devices a reference clock time from any selected one of the network devices.

Further in accordance with an embodiment of the present disclosure the reference clock time is in Coordinated Universal Time (UTC) format.

Still further in accordance with an embodiment of the present disclosure the selected network device includes a network interface to receive packets over a network from a remote clock, which outputs the reference clock time.

Additionally in accordance with an embodiment of the present disclosure the selected network device is configured to recover the reference clock time from the packets Precision Time Protocol (PTP).

Moreover, in accordance with an embodiment of the present disclosure, the system includes a controller to selectively block and unblock distribution of the reference clock time in the closed loop responsively to one of the network devices being designated as a local reference clock.

Further in accordance with an embodiment of the present disclosure the network devices include at least one of the following a data processing unit (DPU), graphics processing unit (GPU), central processing unit (CPU).

switch, network interface controller.

Still further in accordance with an embodiment of the present disclosure each of the network devices includes a network interface to transmit and receive clock synchronization messages over at least one network link, and clock synchronization circuitry to process the clock synchronization messages so as to recover a remote clock time.

Additionally in accordance with an embodiment of the present disclosure a first one of the network devices includes clock synchronization circuitry to recover a remote clock time, a physical hardware clock, a clock input port connected to another clock output port of a second one of the network devices via a first one of the clock connections, and configured to receive a first clock signal indicative of the reference clock time from the second network device, and a clock output port connected to another clock input port of a third one of the network devices via a second one of the clock connections.

Moreover, in accordance with an embodiment of the present disclosure the second network device and the third network device are a same one of the network devices.

Further in accordance with an embodiment of the present disclosure the clock synchronization circuitry is configured to discipline the physical hardware clock to the reference clock time responsively to the recovered remote clock time, or the received clock signal, and output a time of the disciplined physical hardware clock in a second clock signal via the clock output port to the third network device.

Still further in accordance with an embodiment of the present disclosure the clock synchronization circuitry is configured to discipline the physical hardware clock to the reference clock time responsively to the recovered remote clock time, and output a time of the disciplined physical hardware clock in a second clock signal via the clock output port to the third network device.

Additionally in accordance with an embodiment of the present disclosure the clock synchronization circuitry is configured to ignore the first clock signal received by the clock input port.

Moreover, in accordance with an embodiment of the present disclosure, the system includes a controller to selectively block distribution of the reference clock time in the closed loop by instructing the clock synchronization circuitry to ignore the first clock signal received by the clock input port responsively to the first network device being designated as a local reference clock.

Further in accordance with an embodiment of the present disclosure the clock synchronization circuitry is configured to discipline the physical hardware clock to the reference clock time responsively to the received clock signal, and output a time of the disciplined physical hardware clock in a second clock signal via the clock output port to the third network device.

Still further in accordance with an embodiment of the present disclosure the network devices are configured to distribute the reference clock time via respective ones of the clock connections using a pulsed signal.

Additionally in accordance with an embodiment of the present disclosure a first one of the network devices includes a controller 14 to instruct clock synchronization circuitry of the first network device located immediately prior to a second one of the network devices, designated as a local reference clock in the closed loop, to not send a clock signal to the second network device.

There is also provided in accordance with another embodiment of the present disclosure, a synchronized communication method, including connecting network devices in a closed loop configuration, and distributing among the network devices a reference clock time from any selected one of the network devices.

Moreover, in accordance with an embodiment of the present disclosure the reference clock time is in Coordinated Universal Time (UTC) format.

Further in accordance with an embodiment of the present disclosure, the method includes the selected network device receiving packets over a network from a remote clock, which outputs the reference clock time.

Still further in accordance with an embodiment of the present disclosure, the method includes the selected network device recovering the reference clock time from the packets Precision Time Protocol (PTP).

Additionally in accordance with an embodiment of the present disclosure, the method includes selectively blocking and unblocking distribution of the reference clock time in the closed loop responsively to one of the network devices being designated as a local reference clock.

Moreover, in accordance with an embodiment of the present disclosure, the method includes transmitting and receiving clock synchronization messages over at least one network link, and processing the clock synchronization messages so as to recover a remote clock time.

Further in accordance with an embodiment of the present disclosure, the method includes a first one of the network devices recovering a remote clock time, connecting a clock input port of the first network device to another clock output port of a second one of the network devices via a first one of the clock connections, the first network device receiving a first clock signal indicative of the reference clock time from the second network device, and connecting a clock output port of the first network device to another clock input port of a third one of the network devices via a second one of the clock connections.

Still further in accordance with an embodiment of the present disclosure the second network device and the third network device are a same one of the network devices.

Additionally in accordance with an embodiment of the present disclosure, the method includes the first network device disciplining a physical hardware clock to the reference clock time responsively to the recovered remote clock time, or the received clock signal, and outputting a time of the disciplined physical hardware clock in a second clock signal via the clock output port to the third network device.

Moreover, in accordance with an embodiment of the present disclosure, the method includes the first network device disciplining a physical hardware clock to the reference clock time responsively to the recovered remote clock time, and output a time of the disciplined physical hardware clock in a second clock signal via the clock output port to the third network device.

Further in accordance with an embodiment of the present disclosure, the method includes the first network device ignoring the first clock signal received by the clock input port.

Still further in accordance with an embodiment of the present disclosure, the method includes selectively block distribution of the reference clock time in the closed loop by instructing clock synchronization circuitry to ignore the first clock signal received by the clock input port responsively to first network device being designated as a local reference clock.

Additionally in accordance with an embodiment of the present disclosure, the method includes the first network device disciplining a physical hardware clock to the reference clock time responsively to the received clock signal, and outputting a time of the disciplined physical hardware clock in a second clock signal via the clock output port to the third network device.

Moreover, in accordance with an embodiment of the present disclosure, the method includes distributing the reference clock time via respective ones of the clock connections using a pulsed signal.

Further in accordance with an embodiment of the present disclosure, the method includes instructing clock synchronization circuitry of a first network device located immediately prior to a second network device, designated as a local reference clock in the closed loop, to not send a clock signal to the second network device.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Clock synchronization between network devices remains a challenge in the networking industry due to continued demand for tighter clock synchronization. One solution is to use PTP clock chaining by chaining multiple PTP capable devices together so that a reference clock time is distributed from one network device at the root of the chain to other network devices in the chain. The root is defined by wiring topology.

PTP clock chaining may have some limitations including imposing a local clock hierarchy that is dictated by the physical wiring, introducing a possible "single point of failure" since the root controls the clock value of the entire chain. For example, if the network device at the root malfunctions, it then becomes impossible to distribute the clock to the remaining network devices. Therefore, if the local reference clock moves to another of the network devices, the reference clock time cannot be distributed based on the physical wiring.

One solution to the above problems is to transfer information regarding reference clock time between the root and the new local reference clock via some centralized entity, such as a software daemon running on a central processing unit (CPU). However, this solution adds complexity to the software-hardware/firmware interfaces, and to the software itself, and may add inaccuracies to the timing solution due to latencies and jitter of the control messages exchanged between the devices and the managing software. Additionally, this solution may add CPU load due to exchanging messages and performing calculations. It should be noted that CPU utilization is extremely important in many use cases, e.g., 5G use cases, where accurate clock synchronization is commonly required.

Embodiments of the present invention, solve at least some of the above problems by connecting network devices using clock connections to connect the network devices in a closed loop configuration. For example, network device 1 is connected to network device 2, which is connected to network device 3, which is connected to network device 1, forming a closed loop. The closed loop may then be used to distribute a reference clock time among the network devices from any selected one of the network devices in the closed loop by passing the reference clock time from network device to network device in the closed loop. For example, if one of the network devices is designated as a local reference clock, the reference clock time is distributed from the network device designated as the local reference clock to the other network devices via the clock connections of the closed loop. If at a later time another one of the network devices is designated as the local reference clock (for example, due to the previous network device designated as a local reference clock malfunctioning), the reference clock time is distributed from the network device of the newly designated local reference clock to the other network devices via the clock connections of the closed loop. Therefore, if one of the network devices malfunctions, it is still possible to operate another one of the network devices to distribute the reference clock time.

In some embodiments, a clock output port of one network device is connected to the clock input port of another network device with a cable or other connection (e.g., a trace on a circuit board), and so on, until all the network devices are connected together in a closed loop. For example, the clock output port of node 1 is connected to the clock input port of node 2, and so on. The clock output port of node 3 is connected to the clock input port of node 1, thereby completing the loop. Upon detecting a clock signal at its clock input port, a network device in the closed loop uses the received clock signal to discipline its physical hardware clock. A time of the physical hardware clock may then be output as a clock signal via the clock output port of that network device to the next network device in the chain, and so on.

In some embodiments, the network device designated as the local reference clock does not use the clock signal received from another network device to discipline its physical hardware clock. Instead, the network device designated as the local reference clock disciplines its physical hardware clock from a recovered remote clock. In some embodiments, software or firmware running on a controller breaks the chain of the closed loop so that the network device designated as the local reference clock does not use a clock signal received via its clock input port. Therefore, software or firmware may instruct the network device designated as the local reference clock to ignore the received clock signal at its clock input port and by default use the recovered remote clock to discipline its physical hardware clock. In other embodiments, software or firmware running on a controller breaks the chain of the closed loop so that the network device designated as the local reference clock does not receive a clock signal via its clock input port. Therefore, in some embodiments, the software or firmware running on the controller may instruct the network device, which would otherwise pass its clock via its clock output port to the network device of the designated local reference clock, to not output a clock signal to the network device of the designated local reference clock.

Each of the network devices may include clock synchronization circuitry which performs at least some of the following: recovering a remote clock and disciplining a local physical hardware clock based on the recovered remote clock, or receiving the clock signal via the chain and discipling the local physical hardware clock based on the received clock signal, and passing a clock value of its physical hardware clock in a clock signal to the next network device in the chain.

System Description

Figure 1:
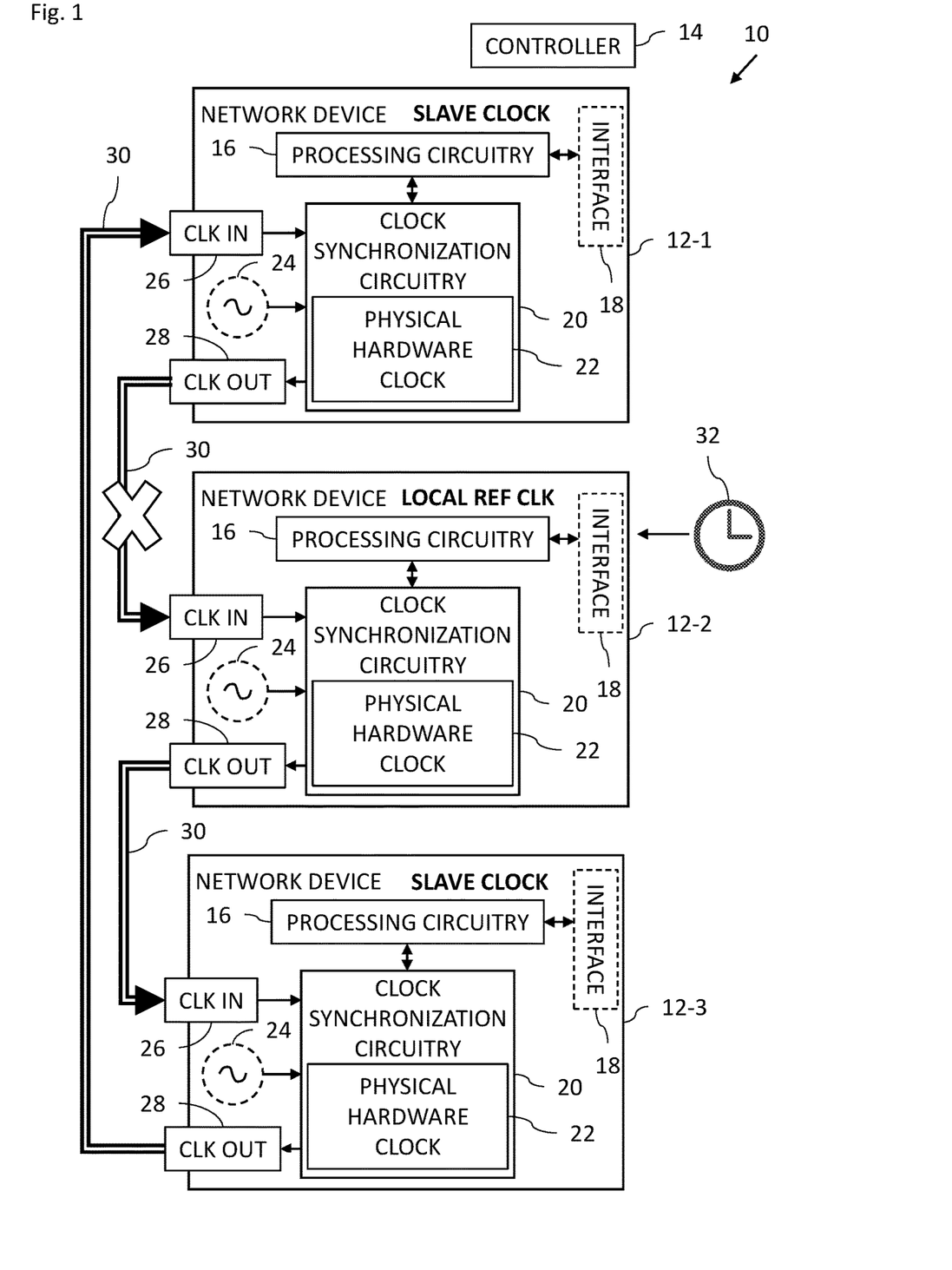
FIG. 1 is a block diagram view of a clock synchronization system with one network device designated as a local reference clock constructed and operative in accordance with an embodiment of the present invention.

Reference is now made to FIG. 1, which is a block diagram view of a clock synchronization system 10 with one network device 12-2 designated as a local reference clock constructed and operative in accordance with an embodiment of the present invention. The system 10 includes a plurality of network devices 12 (labeled network devices 12-1, 12-2, 12-3), and a controller 14. Each network device 12 may include processing circuitry 16, a network interface 18, clock synchronization circuitry 20, a physical hardware clock 22, an oscillator 24, a clock input port 26, and a clock output port 28.

A plurality of clock connections 30 are configured to connect the network devices 12 in a closed loop configuration. For example, network device 12-1 is connected to network device 12-2, which is connected to network device 12-3, which in turn is connected to network device 12-1 via the clock connections 30 as described in more detail below.

FIG. 1 shows three network devices 12 connected together in a closed loop configuration. The system 10 may include two network devices 12 connected together in a closed loop configuration, described in more detail with reference to FIG. 5. The system 10 may include more than three network devices 12 connected together in a closed loop configuration. The network devices 12 may be disposed on the same printed circuit board (not shown) with the clock connections 30 being implemented using printed circuit board (PCB) traces (not shown) on the circuit board between the network devices 12.

The processing circuitry 16 may include hardwired processing circuitry and/or one or more processors on which to execute software. The software may be downloaded to the network device 12 or disposed on the network device 12 at manufacture. The processing circuitry 16 may include packet processing circuitry which may include a physical layer (PHY) chip and MAC chip (not shown). The processing circuitry 16 may include switching circuitry, and/or graphics processing unit (GPU) or any suitable processor, described in more detail with reference to FIG. 6. The network device 12 may include a data processing unit (DPU) or SmartNIC.

In some embodiments, the network interface 18 is configured to receive packets over a network from a remote clock 32, which outputs a reference clock time. In some embodiments, any one of the network devices 12 is configured to recover the reference clock time from the packets according to the Precision Time Protocol (PTP). In some embodiments, the network interface 18 is configured to transmit and receive clock synchronization messages over at least one network link (e.g., from the remote clock 32), and the clock synchronization circuitry 20 is configured to process the clock synchronization messages so as to recover a remote clock time from the remote clock 32. The clock synchronization messages may be received via any suitable interface via any suitable communication method and/or protocol.

The physical hardware clock 22 may be implemented as any suitable hardware clock, for example, a PTP hardware clock. The physical hardware clock 22 may be implemented as a physical clock, which is stored on the device 12. In some embodiments, the physical hardware clock 22 may be implemented as a hybrid hardware and software clock in which hardware stores a free running clock (e.g., a hardware counter which is incremented), and software holds parameters which convert the hardware clock into the actual clock time. In some embodiments, when the physical hardware clock 22 is implemented as a hybrid hardware and software clock, the PTP or PHC time and frequency adjustments do not affect the physical free running clock, but only the conversion parameters.

The clock input port 26 of one of the network devices 12 (e.g., network device 12-1) is connected to the clock output port 28 of another one of the network devices 12 (e.g., network device 12-3) via one of the clock connections 30, and configured to receive a clock signal indicative of the reference clock time from the other network device 12 (e.g., network device 12-3). The clock output port 28 of one of the network devices 12 (e.g., network device 12-1) is connected to the clock input port 26 of another one of the network devices 12 (e.g., network device 12-2) via one of the clock connections 30. The clock output port 28 of the network device 12-2 is connected to the clock input port 26 of the network device 12-3 via one of the clock connections 30.

In general, the network devices 12 are configured to distribute among the network devices 12 the reference clock time from any selected one of the network devices, for example, the computer node 12-2 designated as the local reference clock. The reference clock time may be maintained in any suitable format, for example, in Coordinated Universal Time (UTC) format.

In the example of FIG. 1, the network device 12-2 disciplines its physical hardware clock 22 to the reference clock time responsively to the recovered remote clock time recovered from the remote clock 32. The network device 12-2 is designated as the local reference clock, for example by the controller 14. The network device 12-2 distributes a time of its physical hardware clock 22 in a clock signal via the clock output port 28 of network device 12-2 to the clock input port 26 of network device 12-3. The network device 12-3 disciplines its physical hardware clock 22 responsively to the received clock signal received at the clock input port 26 of network device 12-3. The network device 12-3 distributes a time of its physical hardware clock 22 in a clock signal via the clock output port 28 of network device 12-3 to the clock input port 26 of network device 12-1. The network device 12-1 disciplines its physical hardware clock 22 responsively to the received clock signal received at the clock input port 26 of network device 12-1. In some embodiments, the network device 12-1 is instructed by the controller 14 not to distribute the clock signal via the clock output port 28 of network device 12-1. In other embodiments, the network device 12-1 distributes the clock signal via the clock output port 28 of network device 12-1 to the clock input port 26 of network device 12-2, which is instructed by the controller 14 to ignore the received clock signal received at the clock input port 26 of network device 12-2. It should be noted that disciplining the physical hardware clocks 22 may include speeding up or slowing down the clocks 22 in order to reach the desired time (e.g., the reference clock time).

The network devices 12 may be configured to distribute the reference clock time via respective clock connections 30 in the form of any signal e.g., using N pulses per second, such as one pulse per second (PPS) signal(s) or 10 mega Hertz (10 MHz) signal(s).

In the network device 12-2 designated as the local reference clock, the network device 12-2 disciplines its physical hardware clock 22 to provide a clock time based on a clock time recovered from the remote clock 32. In the network device(s) 12-1, 12-3 not designated as the local reference clock, the clock signal received at the clock input port 26 is used to discipline the respective physical hardware clock 22.

In some embodiments, software or firmware running on the controller 14 breaks the chain of the closed loop so that the network device 12-2 designated as the local reference clock does not use a clock signal received at its clock input port 26 or does not receive a clock signal at its clock input port 26, as described in more detail with reference to FIG. 3.

When the network devices 12 boot up, each network device 12 looks for a clock signal being received at its own clock input port 26 and if a clock signal is not found, the respective network device 12 uses a local clock, for example, based on an output of the oscillator 24 in that network device 12. Therefore, the first network device 12 to boot up outputs a clock signal based on its physical hardware clock 22 from its clock output port 28 to the next network device 12 in the closed loop. The next network device 12 then detects the clock signal input via its clock input port 26 and uses the received clock signal to discipline its physical hardware clock 22, and so on. When one of the network devices 12 is designated as a local reference clock, that network device 12 does not use the clock signal received at its clock input port 26, but disciplines its physical hardware clock 22 based on the remote clock 32 and outputs a clock signal indicative of the clock value of its physical hardware clock 22 via its clock output port 28 to the next network device 12 in the loop, and so on. Another option is to assign one of the network devices 12 as a default local reference clock.

Figure 2:
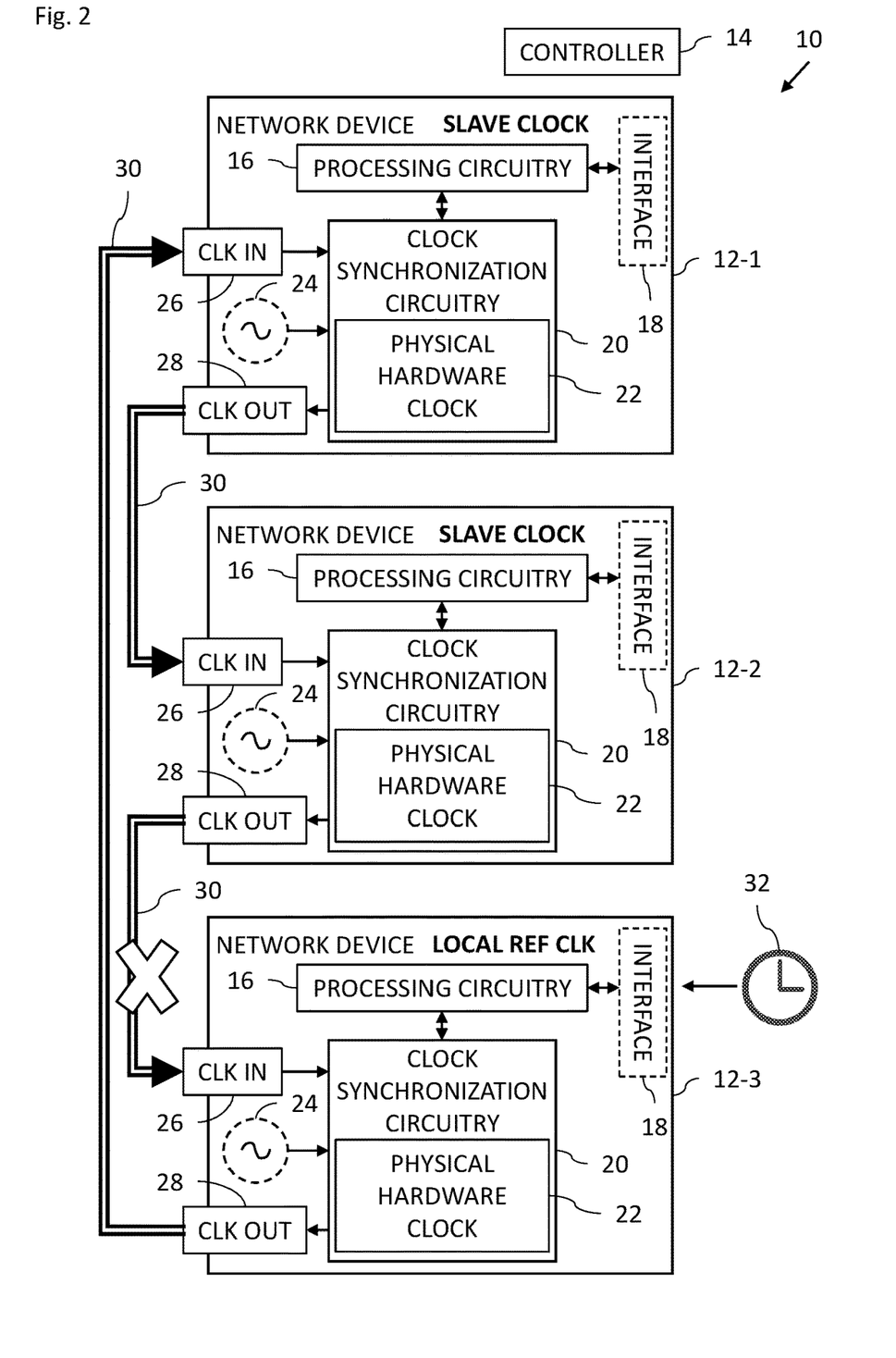
FIG. 2 is a block diagram view of the clock synchronization system of FIG. 1 with another network device designated as the local reference clock.

Reference is now made to FIG. 2, which is a block diagram view of the clock synchronization system 10 of FIG. 1 with network device 12-3 designated as the local reference clock. The local reference clock may be moved from one network device 12 to another due to many reasons, for example, the remote clock 32 used by one of the network devices 12 previously designated as the local reference clock may now be non-functional or deemed to be less accurate than a remote clock used by another one of the network devices 12 now designated as the local reference clock.

In the example of FIG. 2, the network device 12-3 is now designated as the local reference clock (for example, by the controller 14), and disciplines its physical hardware clock 22 from the remote clock 32. The network device 12-3 may: ignore any clock signal received at its clock input port 26; or the controller 14 may instruct the network device 12-2 to cease outputting a clock signal via the clock output port 28 of network device 12-2. The network device 12-3 distributes a clock signal indicative of the clock time of its physical hardware clock 22 via the clock output port 28 of network device 12-3 to the clock input port 26 of the network device 12-1. The network device 12-1 disciplines its physical hardware clock 22 responsively to the received clock signal received at the clock input port 26 of network device 12-1. The network device 12-1 distributes a clock signal indicative of the clock time of its physical hardware clock 22 via the clock output port 28 of network device 12-1 to the clock input port 26 of network device 12-2. The network device 12-2 disciplines its physical hardware clock 22 responsively to the received clock signal received at the clock input port 26 of network device 12-2. As mentioned above, in some embodiments, the network device 12-2 is instructed by the controller 14 not to distribute a clock signal via the clock output port 28 of network device 12-2. In other embodiments, the network device 12-2 distributes a clock signal indicative of the clock time of its physical hardware clock 22 via the clock output port 28 of network device 12-2 to the clock input port 26 of network device 12-3, which is instructed by the controller 14 to ignore the received clock signal received at the clock input port 26 of network device 12-3.

Figure 3:
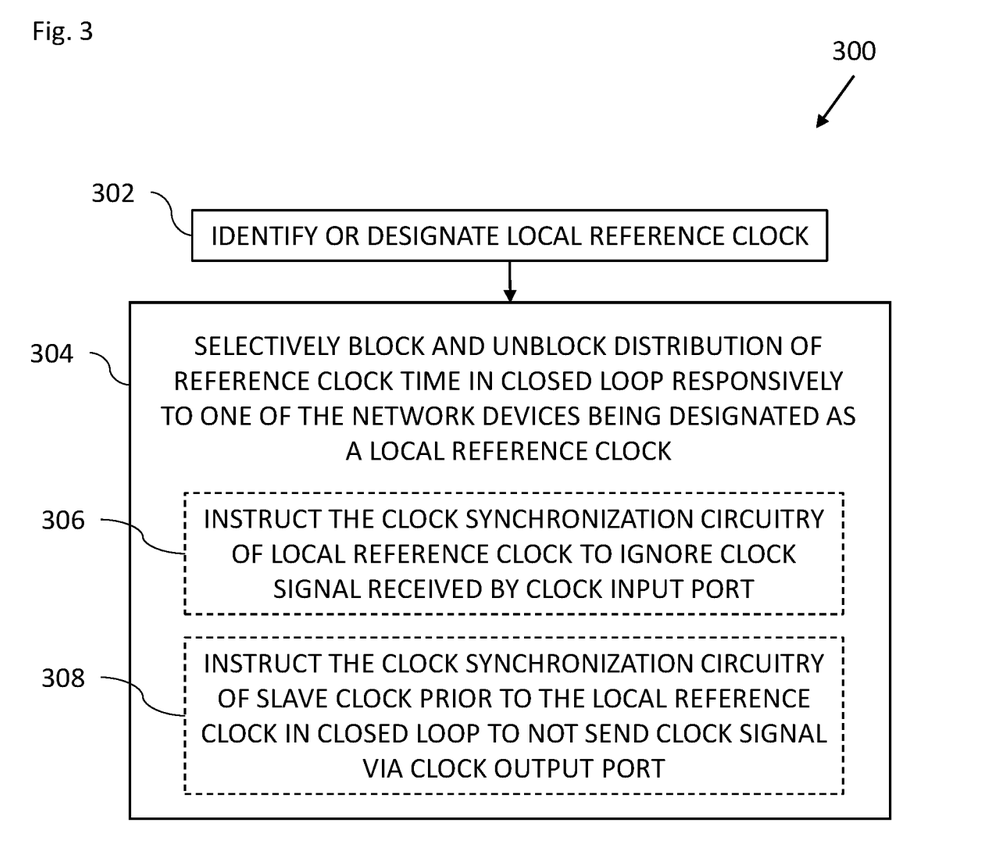
FIG. 3 is a flowchart including steps in a method of operation of a controller of the system of FIG. 1.

Reference is now made to FIG. 3, which is a flowchart 300 including steps in a method of operation of the controller 14 of the system 10 of FIG. 1.

In some embodiments, the controller 14 is configured to run a software daemon which knows the topology of the system 10 (i.e., how the network devices 12 are connected in the closed loop) and which network device 12 is the local reference clock (e.g., PTP master) so that the software daemon knows where to block and unblock the closed loop. If the network devices 12 are disposed in different hosts, then the hosts may need to communicate with respect to blocking and unblocking the closed loop.

The controller 14 is configured to identify or designate one of the network devices 12 as the local reference clock (block 302). The controller 14 is configured to selectively block and unblock distribution of the reference clock time in the closed loop responsively to one of the network devices 12 being designated as a local reference clock (block 304). In some embodiments, the controller 14 is configured to instruct the clock synchronization circuitry 20 of the network device 12 designated as the local reference clock to ignore the clock signal received at its clock input port 26 responsively to that network device 12 being designated as the local reference clock (block 306). In other embodiments, the controller 14 is configured to instruct the clock synchronization circuitry 20 of the network device 12 (designated as a slave clock and) located immediately prior to the network device 12 designated as the local reference clock in the closed loop to not send a clock signal via its clock output port 28 to the network device 12 designated as the local reference clock (block 308).

In practice, some or all of the functions of the controller 14 may be combined in a single physical component or, alternatively, implemented using multiple physical components. These physical components may comprise hard-wired or programmable devices, or a combination of the two. In some embodiments, at least some of the functions of the controller 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 4:
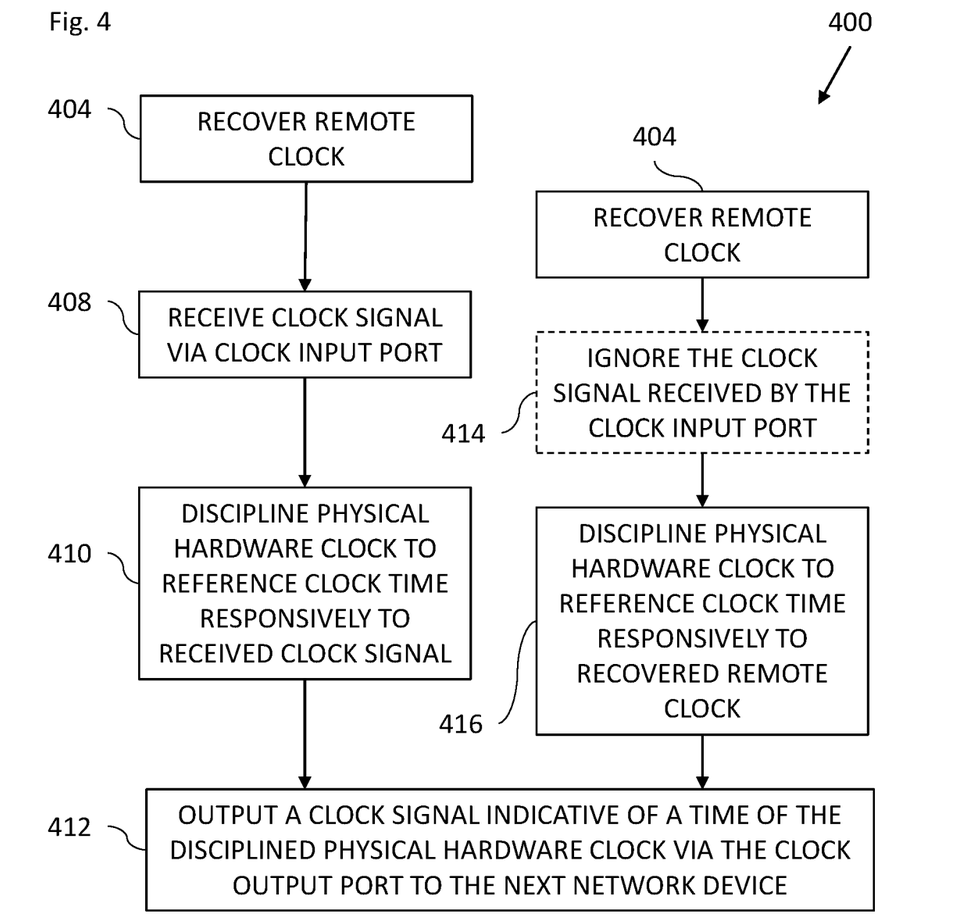
FIG. 4 is a flowchart including steps in a method of operation of clock synchronization circuitry in a network device in the system of FIG. 1.

Reference is now made to FIG. 4, which is a flowchart 400 including steps in a method of operation of the clock synchronization circuitry 20 in one of the network devices 12 (e.g., network device 12-3) in the system 10 of FIG. 1.

The flowchart 400 is first traversed assuming that the network device 12-3 is designated as a slave clock.

When the network device 12-3 first boots up, the clock synchronization circuitry 20 of the network device 12-3 is configured to generate a clock responsively to an output from the oscillator 24. After a short delay, assuming there is still no clock signal received by the clock input port 26 of the network device 12-3, the clock synchronization circuitry 20 of the network device 12-3 is configured to recover a remote clock, e.g., from the remote clock 32 (block 404) and discipline its physical hardware clock 22 responsively to the recovered remote clock. The clock synchronization circuitry 20 of the network device 12-3 is configured to receive a clock signal via the clock input port 26 of the network device 12-3 (block 408) from the previous network device 12-2 in the closed loop. The clock synchronization circuitry 20 of the network device 12-3 is configured to discipline its physical hardware clock 22 to the reference clock time responsively to the received clock signal (block 410). The clock synchronization circuitry 20 of the network device 12-3 is configured to output a clock signal indicative of a time of its disciplined physical hardware clock 22 via the clock output port 28 of the network device 12-3 to the next network device 12-1 in the closed loop (block 412).

The flowchart 400 is now traversed assuming that the network device 12-3 is now designated as a local reference clock.

When the network device 12-3 first boots up, the clock synchronization circuitry 20 of the network device 12-3 is configured to generate a clock responsively to an output from the oscillator 24. The clock synchronization circuitry 20 of the network device 12-3 is configured to recover a remote clock, e.g., from the remote clock 32 (block 404). If a clock signal is received by the clock synchronization circuitry 20 of the network device 12-3 via the clock input port 26 of network device 12-3, the clock synchronization circuitry 20 of the network device 12-3 is configured to ignore the clock signal received by the clock input port 26 (block 414). The clock synchronization circuitry 20 of network device 12-3 is configured to discipline its physical hardware clock 22 to the reference clock time responsively to the recovered remote clock (recovered in the step of block 404) (block 416). The clock synchronization circuitry 20 of the network device 12-3 is then configured to perform the step of block 412.

In practice, some or all of the functions of the clock synchronization circuitry 20 may be combined in a single physical component or, alternatively, implemented using multiple physical components. These physical components may comprise hard-wired or programmable devices, or a combination of the two. In some embodiments, at least some of the functions of the clock synchronization circuitry 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 5:
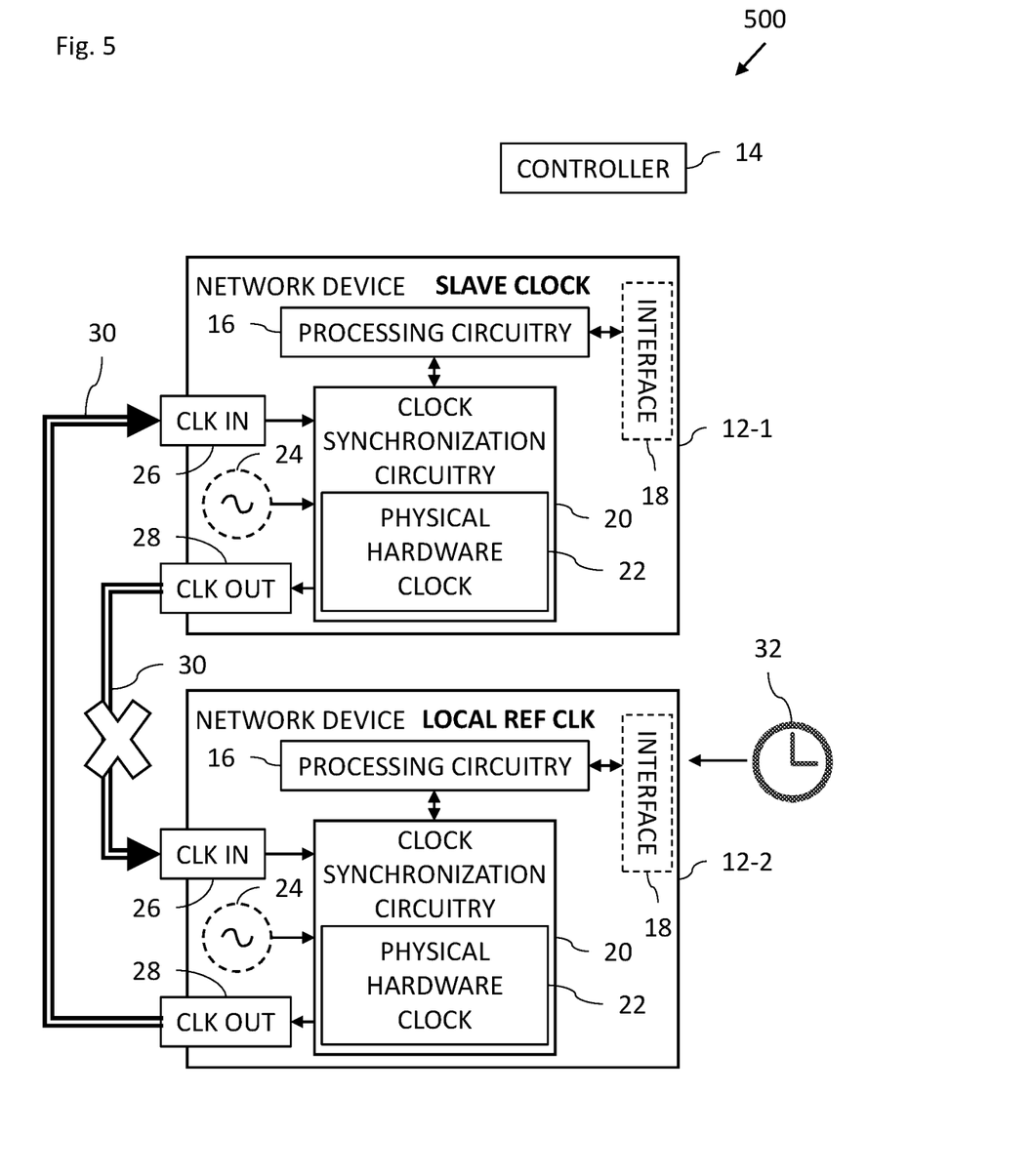
FIG. 5 is a block diagram view of a clock synchronization system with two network devices constructed and operative in accordance with an alternative embodiment of the present invention.

Reference is now made to FIG. 5, which is a block diagram view of a clock synchronization system 500 with two network devices 12 constructed and operative in accordance with an alternative embodiment of the present invention.

The clock synchronization system 500 is substantially the same as the system 10 except that in the clock synchronization system 500 there are only two computes node 12. The clock synchronization system 500 may be compared to combining network devices 12-1, 12-3 of system 10 into the same network device 12-1, which is in a closed loop with the network device 12-2.

In the clock synchronization system 500, the clock output port 28 of network device 12-1 is connected to the clock input port 26 of network device 12-2 via one of the clock connections 30, and the clock output port 28 of network device 12-2 is connected to the clock input port 26 of network device 12-1 via another one of the clock connections 30 thereby forming the closed loop.

Figure 6:
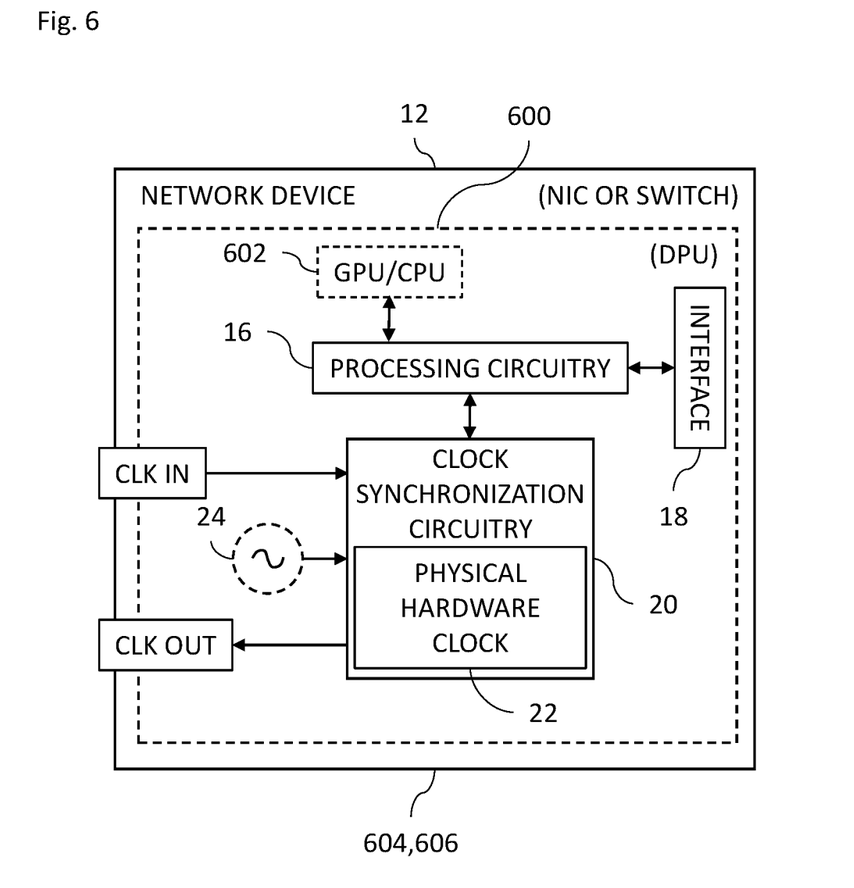
FIG. 6 is a more detailed block diagram view of a network device in the system of FIG. 1.

Reference is now made to FIG. 6, which is a more detailed block diagram view of one of the network devices 12 in the system 10 of FIG. 1. The network device 12 may include any one or more of the following: a data processing unit (DPU) 600, a graphics processing unit (GPU) or central processing unit (CPU) 602, a switch 604, or a network interface controller (NIC) 606. The DPU 600 may include the processing circuitry 16 (e.g., one or more processing cores), the network interface 18, the clock synchronization circuitry 20, the physical hardware clock 22, and the oscillator 24.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A synchronized communication system, comprising:
   a plurality of network devices including a first network device, one or more intermediate network devices, and a last network device; and
   clock connections to connect the network devices in a closed loop configuration, wherein:
      each of the network devices has an output connected to an input of a next one of the network devices via a respective one of the clock connections, while the last network device has an output connected to an input of the first network device via another respective one of the clock connections;
      the network devices are configured to distribute among the network devices, via ones of the clock connections, a reference clock time from any selected one of the network devices, which is designated as a local reference clock;
      at a first time, one of the plurality of network devices is designated as the local reference clock and is configured to distribute the reference clock time among the network devices; and
      at a second time, another one of the plurality of network devices is designated as the local reference clock and is configured to distribute the reference clock time among the network devices.

2. The system according to claim 1, wherein the reference clock time is in Coordinated Universal Time (UTC) format.

3. The system according to claim 1, wherein the selected network device includes a network interface to receive packets over a network from a remote clock, which outputs the reference clock time.

4. The system according to claim 3, wherein the selected network device is configured to recover the reference clock time from the packets according to Precision Time Protocol (PTP).

5. The system according to claim 1, further comprising a controller to selectively block and unblock distribution of the reference clock time in the closed loop responsively to one of the network devices being designated as the local reference clock.

6. The system according to claim 1, wherein the network devices include at least one of the following: a data processing unit (DPU), graphics processing unit (GPU), central processing unit (CPU), switch, network interface controller.

7. The system according to claim 1, wherein each of the network devices comprises:
   a network interface to transmit and receive clock synchronization messages over at least one network link; and
   clock synchronization circuitry to process the clock synchronization messages so as to recover a remote clock time.

8. The system according to claim 1, wherein the first network device comprises:
   clock synchronization circuitry to recover a remote clock time;
   a physical hardware clock;
   a clock input port connected to another clock output port of a second one of the network devices via a first one of the clock connections, and configured to receive a first clock signal indicative of the reference clock time from the second network device; and
   a clock output port connected to another clock input port of a third one of the network devices via a second one of the clock connections.

9. The system according to claim 8, wherein the second network device and the third network device are a same one of the network devices.

10. The system according to claim 8, wherein the clock synchronization circuitry is configured to:
    discipline the physical hardware clock to the reference clock time responsively to: the recovered remote clock time; or the received clock signal; and
    output a time of the disciplined physical hardware clock in a second clock signal via the clock output port to the third network device.

11. The system according to claim 8, wherein the clock synchronization circuitry is configured to:
    discipline the physical hardware clock to the reference clock time responsively to the recovered remote clock time; and
    output a time of the disciplined physical hardware clock in a second clock signal via the clock output port to the third network device.

12. The system according to claim 11, wherein the clock synchronization circuitry is configured to ignore the first clock signal received by the clock input port.

13. The system according to claim 12, further comprising a controller to selectively block distribution of the reference clock time in the closed loop by instructing the clock synchronization circuitry to ignore the first clock signal received by the clock input port responsively to the first network device being designated as the local reference clock.

14. The system according to claim 8, wherein the clock synchronization circuitry is configured to:
    discipline the physical hardware clock to the reference clock time responsively to the received clock signal; and
    output a time of the disciplined physical hardware clock in a second clock signal via the clock output port to the third network device.

15. The system according to claim 1, wherein the network devices are configured to distribute the reference clock time via respective ones of the clock connections using a pulsed signal.

16. The system according to claim 1, wherein a first one of the network devices includes a controller 14 to instruct clock synchronization circuitry of the first network device located immediately prior to a second one of the network devices, designated as the local reference clock in the closed loop, to not send a clock signal to the second network device.

17. A synchronized communication method, comprising:
connecting network devices including a first network device, one or more intermediate network devices, and a last network device with clock connections in a closed loop configuration so that each of the network devices has an output connected to an input of a next one of the network devices via a respective one of the clock connections, while the last network device has an output connected to an input of the first network device via another respective one of the clock connections; and
distributing among the network devices, via ones of the clock connections, a reference clock time from any selected one of the network devices, which is designated as a local reference clock;
at a first time, designating one of the network devices as the local reference clock and distributing the reference clock time among the network devices; and
at a second time, designating another one of the network devices is designated as the local reference clock and distributing the reference clock time among the network devices.

18. The method according to claim 17, wherein the reference clock time is in Coordinated Universal Time (UTC) format.

19. The method according to claim 17, further comprising the selected network device receiving packets over a network from a remote clock, which outputs the reference clock time.

20. The method according to claim 19, further comprising the selected network device recovering the reference clock time from the packets according to Precision Time Protocol (PTP).

21. The method according to claim 17, further comprising selectively blocking and unblocking distribution of the reference clock time in the closed loop responsively to one of the network devices being designated as the local reference clock.

22. The method according to claim 17, further comprising:
transmitting and receiving clock synchronization messages over at least one network link; and
processing the clock synchronization messages so as to recover a remote clock time.

23. The method according to claim 17, further comprising:
the first network device recovering a remote clock time;
connecting a clock input port of the first network device to another clock output port of a second one of the network devices via a first one of the clock connections;
the first network device receiving a first clock signal indicative of the reference clock time from the second network device; and
connecting a clock output port of the first network device to another clock input port of a third one of the network devices via a second one of the clock connections.

24. The method according to claim 23, wherein the second network device and the third network device are a same one of the network devices.

25. The method according to claim 23, further comprising the first network device:
disciplining a physical hardware clock to the reference clock time responsively to: the recovered remote clock time; or the received clock signal; and
outputting a time of the disciplined physical hardware clock in a second clock signal via the clock output port to the third network device.

26. The method according to claim 23, further comprising the first network device:
disciplining a physical hardware clock to the reference clock time responsively to the recovered remote clock time; and
output a time of the disciplined physical hardware clock in a second clock signal via the clock output port to the third network device.

27. The method according to claim 26, further comprising the first network device ignoring the first clock signal received by the clock input port.

28. The method according to claim 27, further comprising selectively block distribution of the reference clock time in the closed loop by instructing clock synchronization circuitry to ignore the first clock signal received by the clock input port responsively to first network device being designated as the local reference clock.

29. The method according to claim 23, further comprising the first network device:
disciplining a physical hardware clock to the reference clock time responsively to the received clock signal; and
outputting a time of the disciplined physical hardware clock in a second clock signal via the clock output port to the third network device.

30. The method according to claim 17, further comprising distributing the reference clock time via respective ones of the clock connections using a pulsed signal.

31. The method according to claim 17, further comprising instructing clock synchronization circuitry of a first network device located immediately prior to a second network device, designated as the local reference clock in the closed loop, to not send a clock signal to the second network device.

* * * * *